Patented Nov. 29, 1949

2,489,668

UNITED STATES PATENT OFFICE 2,489,668

PROCESS FOR PREPARING N-DI(BETA BENZOYLETHYL)-LOWER ALKYLAMINES

John Thomas Plati, Passaic, and Wilhelm Wenner, Montclair, N. J., assignors to Hoffmann-La Roche Inc., Roche Park, Nutley, N. J., a corporation of New Jersey No Drawing. Application January 11, 1947, Serial No. 721,673

5 Claims. (Cl. 260—570.5)

The present invention relates to improved methods for the manufacture of salts of diketoamines. The invention also relates to new diketoamine salts and to their method of preparation. The new diketoamine salts can be represented more particularly by the following formula:

(I)

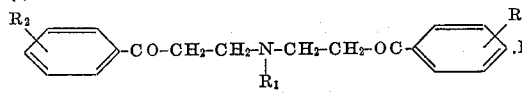

In the above formula, $R_1$ represents an alkyl radical such as, for example, methyl, ethyl, propyl, isopropyl, butyl, amyl, and the like; $R_2$ and $R_3$ stand for hydrogen and alkyl as, for example, methyl, ethyl, propyl, isobutyl and the like, or an alkoxy radical as for instance, methoxy, ethoxy and the like, with the proviso that where $R_2$ and $R_3$ are both hydrogen, $R_1$ is other than methyl, and X is a monovalent acid radical such as chlorine, bromine and the like.

A method for preparing the known compound of the following formula:

(II)

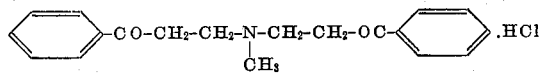

has been described by Mannich and Heilner (Ber. 55, 356, 362 [1922]), by Warnat (C. A. 31, 2592 [1937]), by Mannich and Hieronimus (Ber. 75, 49 [1942]), and by Blicke and Burchalter (J. A. C. S. 64, 453 [1942]). However, the procedure used by all these authors consists in heating formaldehyde, methylamine hydrochloride, and acetophenone in alcoholic solution. As a result of this reaction, the investigators found that besides the compound of Formula II, varying amounts of the monoketoamine of Formula III are formed.

(III) 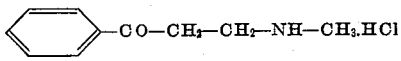

The total yield of methyl-di-(β-benzoyl-ethyl)-amine hydrochloride (II) is reported by Mannich and Heilner to be 31 per cent, whereas Blicke and Burckhalter in their attempts to prepare predominantly compound III, found the yield of II to be 34 per cent. It will thus be seen that according to the known procedure, compound II is obtained only in rather poor yield. Furthermore, it is obtained mixed with considerable amounts of by-products and unreacted material.

Our invention provides an improved process which will presently be described, by which not only specific compound II, but compounds in general of type I may be readily and simply obtained in high yields. Our new process will be illustrated in connection with the production of compound II since this compound is of special interest because it is a cheap and useful starting material for the synthesis of piperidine derivatives.

According to one embodiment of our invention formaldehyde, methylamine hydrochloride, and acetophenone are reacted together in the absence of a solvent. The reaction takes place vigorously and gives compound II in yields ranging from 70–90 per cent. In another modification of our new process, we have found that by employing an excess of the acetophenone as a solvent, the reaction also gives yields of 70 per cent and more.

In a preferred embodiment of our process, we have found that by employing a chlorinated hydrocarbon as a diluent, such as carbon tetrachloride, chloroform, tetrachlorethane, and the like, and especially tetrachloroethane, that not only are high yields of compound II obtained, but many other advantages are also effected. Thus, for example, by distilling part of the tetrachlorethane from the reaction mixture, the water formed during the reaction is removed. This is of especial importance since the steam distillation of the hydrochloride of compound II leads to decomposition with formation of phenyl-vinyl-ketone, and the monoketone, III. (See Mannich and Heilner, Ber. 55, 356 [1942]; especially page 363, chapter 2.) It is therefore obvious that the presence of water in the hot reaction mixture such as occurs in the known procedure is highly unfavorable and leads to undesirable side-reactions. By the employment of tetrachloroethane, such side reactions are minimized by the removal of water. As a result of this improved procedure utilizing chlorinated hydrocarbons as the diluent, yields of compound II are raised to values of 70 per cent and more.

Thus, our invention provides a new method which is greatly superior to the known processes since the yield of from 30 to 35 per cent obtained by the old procedure is increased to yields of 70 per cent and more of compound II by our new procedure. This increase in yield represents an unexpected and considerable improvement over the yields previously obtained.

While we have illustrated our invention in terms of preparing compound II, we have found that it is especially effective in the preparation of diketones of the general Formula I. In the preparation of new ketones of Formula I, the advantages of our new method becomes still more pronounced as compared with the use of alcohol as a solvent. We have found that in many cases it is extremely difficult to isolate the desired compounds of Formula I when alcohol is used as a solvent, whereas the preparation of these compounds presents no special difficulties when practicing our new method. Depending upon the particular substituents $R_1$, $R_2$ and $R_3$, either the method using chlorinated hydrocarbon as a diluent as, for example, tetrachloroethane, or the one employing excess of the acetophenone, or the one carried out in the absence of any solvent may be the more suitable.

In practicing our new process for preparing diketoamines, we may employ any primary amine as, for example, methylamine, ethylamine, propylamine, isopropylamine, butylamine, amylamine and the like in the form of their salts, for example, their hydrochlorides and hydrobromides. In addition to acetophenone, its ring-substituted derivatives such as alkyl and alkyloxy acetophenone as, for example, methyl-acetophenone, ethyl-acetophenone, methoxy-acetophenone, ethoxy-acetophenone and the like can be employed. As a formaldehyde, there can be employed formaldehyde itself or a formaldehyde-yielding compound such as formalin, paraformaldehyde, trioxymethylene, formaldehyde bisulfite, formaldehyde diethyl acetal, and the like. In practice, the primary amine salt, the acetophenone and the formaldehyde are warmed without a solvent, or with the chlorinated hydrocarbon, or with an excess of the acetophenone to temperatures of about 40°–100° C. The amine salt, formaldehyde and the acetophenone are employed in molecular ratios of one to at least two, to at least two, respectively. In cases where the acetophenone in excess is used as a solvent, the molecular ratio of the acetophenone is higher than two. Thus the acetophenone may be employed in excess of 50–100 per cent or more. Furthermore, we have found that more than two moles of formaldehyde, in certain cases, is favorable and in no case impairs the yields of the diketoamine obtained.

In most cases the reaction products crystallize directly from the reaction mixture. In others, it is advantageous to remove part of the solvent or diluent by distillation before filtering the reaction product. The diketoamines are obtained in the form of their salts, as for example, their hydrochlorides or hydrobromides. They are readily soluble in water and their solubility in alcohol and in acetone varies with the nature of the particular substituents.

The new compounds are important intermediates for the preparation of new heterocyclic bases. The following examples will serve to illustrate the invention.

Example 1

A mixture of 67.5 grams of methylamine hydrochloride, 360 cc. of acetophenone and 60 grams of paraformaldehyde is stirred and heated. At about 80° C. a vigorous reaction occurs. The heating source is removed. The temperature rises spontaneously to about 110°–120° C. The entire mass solidifies. After cooling, it is stirred with 500 cc. of toluene, filtered, and washed with petroleum ether. 280 grams (84 per cent) of crude N-di-β-benzoylethyl)-methylamine hydrochloride of M. P. 149–155° C. are obtained.

Example 2

A mixture of 16.9 grams methylamine hydrochloride and 240 cc. of acetophenone is heated with stirring to a temperature of 80° C. At this temperature, two grams of paraformaldehyde are added. In intervals of about five minutes, two grams of paraformaldehyde are added until a total of 16 grams of paraformaldehyde are consumed. The thick suspension which forms is cooled and filtered. The crystals are stirred with 150 cc. of petrolether and filtered. N-di-(β-benzoylethyl)-methylamine hydrochloride is obtained in 85 per cent yield.

Example 3

A mixture of 41 grams of ethylamine hydrochloride, 120 grams of acetophenone and 30 grams of paraformaldehyde is heated with stirring. At about 80° C. a vigorous reaction occurs, the temperature rising to about 120° C. Stirring and heating are discontinued at the start of the vigorous reaction and stirring is resumed after it subsides. When the temperature has dropped to about 65° C., 300 cc. of ethylacetate are added and the solution allowed to crystallize. In this manner, 147 grams of N-di-(β-benzoylethyl)-ethylamine hydrochloride are obtained. The pure material is obtained by crystallization from alcohol and has a M. P. of 138–139° C.

Example 4

A mixture of 55 grams of n-butylamine hydrochloride, 120 grams of acetophenone and 30 grams of paraformaldehyde is heated with stirring. At about 75–80° C. a vigorous reaction starts. Stirring is discontinued. The temperature rises to about 120° C. When the temperature has fallen to about 100° C., stirring is resumed. After cooling to 40° C., 700 cc. of water are added. The mixture is stirred for about one hour and filtered. N-di-(β-benzoylethyl)-n-butylamine hydrochloride is thus obtained. After crystallization from ethylacetate it melts at 78–80° C.

Example 5

A mixture of 240 grams of acetophenone, 126 grams of paraformaldehyde, 136 grams of methylamine hydrochloride, and 480 cc. of carbon tetrachloride is heated to a temperature of about 70° C. for about 30 minutes, during which time most of the paraformaldehyde and methylamine hydrochloride goes into solution. Then a slight vacuum is applied, so that carbon tetrachloride distills off at the indicated temperature. An additional 240 grams of acetophenone are added over a period of 20–30 minutes. Distillation is continued until 60 cc. of water are collected with the distilling carbon tetrachloride. After a total reaction time of about three hours, the mixture is cooled, and 500 cc. of acetone are added. The crystals were filtered, washed with acetone and dried. 320 grams of N-di-(β-benzoylethyl)-methylamine hydrochloride are obtained.

Example 6

A mixture of 120 grams of acetophenone, 32 grams of paraformaldehyde, and 34 grams of methylamine hydrochloride is stirred and heated. At about 80° C. a vigorous reaction occurs. The temperature rises spontaneously to about 100° C. Stirring is discontinued. A solid mass of crystals is formed. After cooling to about 50° C., 200 cc. of ethylalcohol are added. The mixture is ground in a mortar. The solid is filtered and washed with some cold alcohol. In this manner, 116 grams (70%) of N - di - (β - benzoylethyl) - methylamine hydrochloride of M. P. 160–161° C. are obtained.

*Example 7*

A mixture of 208 grams of methylamine hydrochloride, 190 grams of paraformaldehyde, 364 grams of acetophenone, and 700 cc. of tetrachloroethane is heated with stirring to 70° C. This temperature is maintained by a bath kept at 70° C. When the temperature begins to rise above 70° C., external heating is discontinued. If, due to the heat of reaction, the temperature rises to 80° C., the mixture is cooled to 70° C. with a bath of cold water. By this time the methylamine hydrochloride and the formaldehyde goes into solution. The mixture is then subjected to vacuum distillation at 50–70 mm. pressure, while an additional amount of 364 grams of acetophenone is added in 15–20 minutes. The temperature of the mixture is maintained at 65–75° C. by external heating, and distillation is continued until 92 cc. of water has been collected with the distilled tetrachloroethane which requires about one hour. Toward the end of this period of time, N-di-(β-benzoylethyl)-methylamine hydrochloride begins to precipitate. The mixture is cooled to room temperature and 900 cc. of acetone are added. The mixture is filtered, washed with acetone and dried. About 700 grams of the compound, M. P. 156° C. are obtained.

*Example 8*

A mixture of 75 grams of p-methoxy-acetophenone, 17 grams of methylamine hydrochloride, 15 grams of paraformaldehyde, and 80 cc. of alcohol is refluxed for 2½ hours. An additional amount of 15 grams of paraformaldehyde is added and refluxing is continued for about 4 hours. The solvent is removed under reduced pressure in the water bath. The residue is dissolved in 40 cc. of water, and the solution is extracted twice with 100 cc. of ether. The aqueous layer is separated and treated with 140 cc. of sodium hydroxide, the liberated base being extracted at the same time with ether. After washing repeatedly with water the ethereal extract is treated with a saturated solution of oxalic acid in ether until no further precipitate is obtained. The crude oxalate is filtered, and refluxed with alcohol. The oxalate remains undissolved and is filtered hot. It is thus obtained as a crystalline material of M. P. 154–157° C.

A solution of 29 grams of this oxalate in water is treated with sodium hydroxide. The liberated base is taken up in ether. The washed ether solution is dried over sodium sulfate. 6 cc. of concentrated sulfuric acid are slowly added. The resulting precipitate is filtered and recrystallized from acetone to give the sulfate of N-di-[β-(p-methoxy-benzoyl)-ethyl]-methylamine of M. P. 96° C.

*Example 9*

A mixture of 125 grams of p-methylacetophenone, 31 grams of methylamine hydrochloride, and 28 grams of paraformaldehyde is heated with stirring. At about 80° C. a vigorous reaction occurs, the temperature rising to about 100–120° C. Stirring is discontinued, until the mixture has cooled to about 50° C. At this temperature about 300 cc. of ethylalcohol is added, and stirring is resumed. The crystals are filtered after stirring for about two hours at room temperature. N-di-(β-p-toluyl-ethyl)-methylamine of M. P. 154–157° C. is obtained.

We claim:

1. The process of producing N-di-(β-benzoylethyl)-lower alkylamines which consists in reacting about one molecular amount of a lower monalkylamine hydrohalide salt with at least two molecular amounts of a formaldehyde and at least two molecular amounts of an acetophenone, so as to form the corresponding N-di-(β-benzoylethyl)-lower alkylamine salt.

2. The process as in claim 1, wherein the acetophenone is employed in excess of about 50–100% of that required for the reaction.

3. The process according to claim 1 wherein the alkylamine is ethylamine and the acetophenone is acetophenone.

4. The process according to claim 1 wherein the alkylamine is n-butylamine and the acetophenone is acetophenone.

5. The process according to claim 1 wherein the alkylamine is methylamine, and the acetophenone is p-methylacetophenone.

JOHN THOMAS PLATI.
WILHELM WENNER.

REFERENCES CITED

The following references are of record in the file of this patent:

FOREIGN PATENTS

| Number | Country | Date |
| --- | --- | --- |
| 379,950 | Germany | Oct. 14, 1921 |

OTHER REFERENCES

Mannich et al., "Ber. deut. Chem.," 55, 356–365 (1922).